United States Patent [19]
Heidelberger et al.

[11] Patent Number: 5,611,070
[45] Date of Patent: Mar. 11, 1997

[54] METHODS AND APPARATUS FOR PERFORMING A WRITE/LOAD CACHE PROTOCOL

[76] Inventors: Philip Heidelberger, 24 Lakeview Ave. W., Peekskill, N.Y. 10566; Harold S. Stone, 50 Cross Ridge Rd., Chappaqua, N.Y. 10514

[21] Appl. No.: 149,139

[22] Filed: Oct. 13, 1993

Related U.S. Application Data

[63] Continuation of Ser. No. 521,776, May 10, 1990, abandoned.

[51] Int. Cl.$^6$ .................................................. G06F 12/12
[52] U.S. Cl. ........................ 395/460; 395/448; 395/468; 364/DIG. 1
[58] Field of Search .................................. 395/425, 448, 395/460, 468, 325; 364/200 MS File, DIG. 1

[56] References Cited

U.S. PATENT DOCUMENTS

| | | | |
|---|---|---|---|
| 4,768,148 | 8/1988 | Keeley et al. | 395/468 |
| 4,843,542 | 6/1989 | Dashiell et al. | 395/446 |
| 4,959,777 | 9/1990 | Holman, Jr. | 395/468 |
| 5,025,365 | 6/1991 | Mathur | 395/600 |
| 5,025,366 | 6/1991 | Baror | 395/455 |
| 5,043,886 | 8/1991 | Witek et al. | 395/470 |
| 5,119,485 | 6/1992 | Ledbetter, Jr. et al. | 395/473 |
| 5,163,131 | 11/1992 | Row et al. | 395/200.01 |
| 5,214,776 | 5/1993 | Bagnoli et al. | 395/800 |
| 5,226,144 | 7/1993 | Moriwaki et al. | 395/448 |
| 5,230,045 | 7/1993 | Sindhu | 395/413 |
| 5,276,828 | 1/1994 | Dion | 395/200.14 |
| 5,345,578 | 9/1994 | Manasse | 395/473 |
| 5,410,697 | 4/1995 | Baird et al. | 395/650 |

OTHER PUBLICATIONS

J. S. Eggers et al. "Evaluating The Performance of Four Snooping Cage Coherecy Protocols", Proceedings of the 16th Ann. International Symposium on Computer Architecture. pp. 2–15.

J. R. Goodman et al. "The Wisconsin Multicube: A New Large–Scale Cache Coherent Multiprocessor", Proceedings/15th Ann. Int. Symposium on C.A. pp. 422–431.

A. R. Kaplin et al. "Competetive Snoopy Caching" Algorithmica, vol. 3, pp. 79–119.

P. Sweazy et al. "A Class of Compatible Cache–Consistency Protocols and Their Support by the IEEE Futurebus". Proceedings/13th Ann. Int. Symp. on C.A. pp. 419–423.

L. Rudolph et al. "Dynamic Decentralized Cache Schemes for Mimd Parallel Processors" Proceedings 11th Ann. Int. Symp. on Comp. Arch., pp. 340–347.

William Stallings, *Computer Organization and Architecture*, 2nd ed. Macmillan, New York, 1990. pp. 124–126.

Harold S. Stone, *High–Performance Computer Architecture*, 2nd ed. Addison–Wesley, U.S., 1990, pp. 29–39.

*Primary Examiner*—Tod R. Swann
*Assistant Examiner*—J. Peikari
*Attorney, Agent, or Firm*—Joseph J. Kaliko; Ronald L. Drumheller

[57] ABSTRACT

A Write/Load cache protocol is described which may be used for maintaining cache coherency and performing barrier synchronization in multiprocessor computer systems, and for cooperating with prefetch mechanisms to allow data to be loaded into a central processor unit's (CPU) cache (in both single and multiprocessor systems) in anticipation of future memory references. The new protocol is defined such that when a cache observes a Write/Load command (and associated data item) on a bus to which the cache is attached, the cache is accessed and (a) if the data item is in the cache, the new value of the data item from the bus is copied into and replaces the data item in cache; and (b) if the data item is not in the cache, a new data item is created therein (preferably using the normal cache replacement policy), and the value of the data item on the bus is loaded into the cache. Thus, a protocol is provided which allows cache to be loaded via an external entity, i.e., other than the processor being directly serviced by the cache.

61 Claims, 2 Drawing Sheets

METHODS AND APPARATUS FOR PERFORMING A WRITE/LOAD CACHE PROTOCOL

This application is a file wrapper continuation of Ser. No. 07/521,776, filed May 10, 1990, now abandoned.

BACKGROUND OF THE INVENTION

1. Field of the Invention

The invention relates generally to the field of data processing, and more particularly to methods and apparatus for managing cache memory resources in a data processing system. A Write/Load cache protocol is described which may be used for maintaining cache coherency and performing barrier synchronization in multiprocessor computer systems, and for cooperating with prefetch mechanisms to allow data to be loaded into a central processor unit's (CPU) cache (in both single and multiprocessor systems) in anticipation of future memory references.

The new protocol is defined such that when a cache observes a Write/Load command (and associated data item) on a bus to which the cache is attached, the cache is accessed and (a) if the data item is in the cache, the new value of the data item from the bus is copied into and replaces the data item in cache; and (b) if the data item is not in the cache, a new data item is created therein (preferably using the normal cache replacement policy), and the value of the data item on the bus is loaded into the cache. Thus, a protocol is provided which allows cache to be loaded via an external entity, i.e., an entity other than the processor being directly serviced by the cache.

2. Description of the Related Art

Two major protocols are well known for maintaining coherence across multiple caches. These protocols are:

(1) Write/Invalidate, which invalidates entries in all other caches when a data item in a local cache is rewritten; and (2) Write/Update, which updates copies of a data item in remote caches when a data item in a local cache is rewritten.

For both of these protocols, a remote cache is changed only when the remote cache contains a copy of an entry in a local cache that is rewritten. If a remote cache does not contain a copy of the locally rewritten item, then the remote cache is not changed.

These basic protocols (and variations thereof) are typically used to achieve cache coherence in multiprocessor computer architectures. They are well known to those skilled in the art, and are well documented in published technical documents and articles.

In particular, an article by J. R. Goodman entitled "Using Cache Memory To Reduce Processor/Memory Traffic" appearing at pp. 124–131 of the proceedings of the 10th Annual Computer Architecture Symposium, published in June, 1983, teaches an early cache coherence protocol called "Write Once". The Write Once protocol is a model for the Write/Invalidate protocol.

L. Rudolph and Z. Segall, in an article entitled "Dynamic Decentralized Cache Schemes For MIMD Parallel Processors" published in 1984, at pp. 340–347 in the 11th Annual International Symposium on Computer Architecture, formally described both the Write/Update and Write/Invalidate protocols. However, no mechanism is described for entering data into a remote cache unless it is done by updating values of data that are already held by the cache.

A very general cache coherence technique that attempts to embody all reasonable variations of the cache coherence protocols known in 1986, is described in an article by P. Sweazey and A. J. Smith, entitled "A Class of Compatible Cache-Consistency Protocols and Their Support By the IEEE Futurebus", published in June, 1986, at pp. 414–423 in the proceedings of the 13th Annual International Symposium on Computer Architecture. The implementation of the cache coherency technique taught in the article includes both Write/Update and Write/Invalidate protocols with several minor variations. The technique described, like the protocols described in the other articles referenced hereinbefore, does not permit data to be entered into a cache by an external process unless the cache data altered are updated copies of data held externally.

Karlin et al, in an article entitled "Competitive Snoopy Caching" published in Vol. 3, pp. 79–119 of Algorithmica, in 1988, also describe a class of cache coherency protocols intended to be representative of all reasonable protocols. Again, several variations of the Write/Update and Write/Invalidate protocols are described. No protocol variation is described that permits cache data to be altered by an external process, except by updating exiting data that are also held externally.

J. R. Goodman and P. J. Woest, in an article entitled "The Wisconsin Multicube: A New Large-Scale Cache-Coherent Multiprocessor", published at pp. 422–431 in the proceedings of the 15th Annual International Symposium on Computer Architecture, in May, 1988, describe a novel two-dimentional arrangement of processors and buses. The processors each have caches that are maintained as a coherent collection of caches through an extension of cache coherence protocols. According to the teachings of Goodman et al, when a processor alters an item, it obtains control of a column bus, and broadcasts a coherence control signal. All caches on that column receive this information and rebroadcast the information on their respective rows. In this way, all caches in the system receive coherence information in two cycles.

According to this scheme, the caches in a column that receive broadcast information alter their control tables, whether or not they contain a copy of the datum that was altered. The reason for altering their states is that they need to hold this information in order to rebroadcast it in the next available cycle for their respective row buses. The protocol used for the second cycle is Write/Invalidate of Write/Update, or a variant thereof.

Once again, no provision is made for altering a cache during the second cycle unless the cache has a copy of the datum originally altered.

Changes made to the caches on a particular column during the first cycle are for the purpose of broadcast during the second cycle. Goodman et al do not teach using such changes for honoring future memory references, and treat cache contents as being distinct from the information held for second cycle broadcast.

In an article by J. S. Eggers and R. H. Katz, entitled "Evaluating the Performance of Four Snooping Cache Coherency Protocols", published at pp. 2–15 in the proceedings of the 16th Annual International Symposium on Computer Architecture, in June, 1989, it was recognized that the existing Write/Update and Write/Invalidate protocols might perform less effectively than a new protocol, a slightly more powerful version of Write/Update as described in the article. The Eggers and Katz protocol updates an item when it is held in a remote cache either as a valid item or as an invalid item that has not yet been purged from the cache. Hence, their variation of Write/Update can revalidate an item in a remote cache, whereas the original variation of Write/Update would leave the item invalid. However, Eggers and Katz do not provide a means for forcing an item into a remote cache if the item were not already held there in some form.

As can be seen with reference to the publications described hereinabove, although the prior art has sought to examine all reasonable variations of cache coherency protocols, no protocol is taught which permits forcing data into a remote cache. As will be seen with reference to the detailed description set forth hereinafter, such a protocol, defined herein as a Write/Load protocol, may be used (1) for maintaining cache coherency and performing barrier synchronization in multiprocessor computer systems and (2) for cooperating with prefetch mechanisms to allow data to be loaded into a central processor unit's (CPU) cache (in both single and multiprocessor systems) in anticipation of future memory references.

Accordingly, it would be desirable if methods and apparatus for supporting a Write/Load Cache Protocol, and, for executing Write/Load commands based on such protocol, were provided. In particular, it would be desirable if the protocol was operative, whenever a cache observes a Write/Load command (and associated data item) on a bus to which the cache is attached, to cause the cache to be accessed and (a) if the data item is in the cache, cause the new value of the data item from the bus to be copied into and replace the data item in cache; and (b) if the data item is not in the cache, to cause a new data item to be created therein (preferably using the normal cache replacement policy), and the value of the data item on the bus to be loaded into the cache. Such a protocol would allow cache memory to be loaded via an external entity, i.e., an entity other than the processor being directly serviced by the cache.

SUMMARY OF THE INVENTION

It is an object of the invention to provide methods and apparatus for maintaining cache coherency in bus-based multiprocessor computer systems.

It is a further object of the invention to provide a cache coherency protocol, for bus-based multiprocessor computer architectures, that reduces bus loading in certain situations, such as at barrier synchronization points.

It is still a further object of the invention to provide methods and apparatus which cooperate with external mechanisms (for example, a prefetch mechanism) to allow data to be loaded into a central processor unit's (CPU) cache (in both in single and multiprocessor systems) in anticipation of future memory references.

Further yet, it is an object of the invention to provide methods and apparatus, in particular new processor chips, new classes of computer architectures, and novel operating methods associated therewith, for use in a data processing system to support the novel Write/Load protocol as defined hereinbefore. In other words, the novel methods and apparatus should be able to support a protocol (and bus command structure) which is operative, whenever a cache observes a Write/Load command (and associated data item) on a bus to which the cache is attached, to cause the cache to be accessed and (a) if the data item is in the cache, cause the new value of the data item from the bus to be copied into and replace the data item in cache; and (b) if the data item is not in the cache, to cause a new data item to be created therein (preferably using the normal cache replacement policy), and the value of the data item on the bus to be loaded into the cache.

According to the invention, these objectives can be achieved utilizing apparatus (and corresponding methods) in a data processing system, including at least one cache memory coupled to a communications bus, comprising (a) means for updating said at least one cache memory in response to the appearance on said communications bus of a first data item in said at least one cache memory; and (b) means for selectively creating an entry in said at least one cache memory, consisting of a second data item appearing on said communications bus, whenever said second data item is not already in said at least one cache memory.

Furthermore, according to one embodiment of the invention, Write/Load protocol means is provided within a given CPU (to support the aforementioned Write/Load protocol), wherein said means is responsive to local processor commands (from within the CPU itself), and external entity commands (for example, bus commands issued by other CPUs, global (main) memory commands, commands from an external prefetch mechanism, etc.) over a bus to the given CPU.

Still further, according to the invention, a Write/Load protocol means is provided which is capable of issuing Write/Load commands and is further capable of communicating such commands to remote entities (for example, other CPUs).

The invention features a new type of communication bus command ("Write/Load") which may be used in any environment in which multiple stores (or storage levels) exist, or where multiple copies of data can be created. The new command functions the same as commands supported by systems utilizing the aforementioned Write/Update protocol (Write/Update commands) except that new copies of data can be selectively created anywhere that a copy can exist (even if previously nonexistent) under the architectural constraints imposed by the host system.

Further features of the invention include the provision of (1) a cache coherence protocol for a bus-based multiprocessor system that facilitate performing barrier synchronization without excessively loading the system communication bus; (2) a cache coherence protocol which allows cache memory to be loaded via an external entity (such as a prefetch mechanism); (3) a cache coherency protocol that can be used in either a broadcast mode to affect all cache memory in a system; or in a multicast mode to selectively load data into remote caches; and (4) new methods and apparatus for supporting such a protocol.

These and other objects and features of the present invention and the manner of obtaining them will become apparent to those skilled in the art, and the invention itself will be best understood by reference to the following detailed description read in conjunction with the accompanying Drawing.

DETAILED DESCRIPTION

Figure 1:
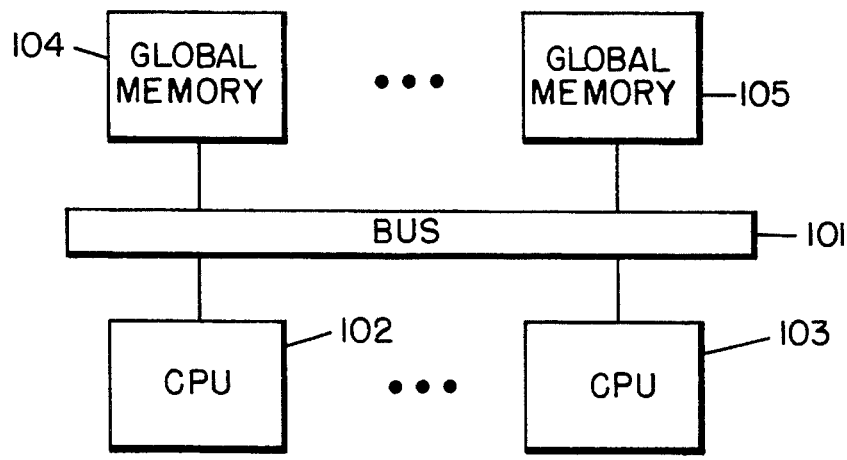
FIG. 1 depicts a high level block diagram of a prior art multiprocessor system including a plurality of CPUs connected to a plurality of global memories via a communications bus.

Reference will be made to FIGS. 1–5 for a description of Write/Load protocol per se, and for an understanding of how such a protocol can be supported in both single and multiprocessor computer systems.

Prior to setting forth the description of the protocol per se, an explanation will be set forth of how the Write/Load protocol can be utilized to reduce bus loading when performing barrier synchronization in a multiprocessor environment. This will enable those skilled in the art to appreciate the utility of the novel protocol.

A barrier for a multiprocessor computer system is a point in a program at which each of N cooperating processors must wait until all have reached that same point in their program. This is a common means for synchronizing the actions of multiple processors, as taught in a publication entitled "High Performance Computer Architecture", by Harold S. Stone, published in 1987 by Addison Wesley.

To appreciate the utility of a Write/Load protocol as defined hereinabove, consider the number of bus cycles required to synchronize N processors when using the Write/Invalidate and Write/Update protocols of the prior art, compared with cycles needed to perform the Write/Load operation. For the purpose of this example, do not count the number of bus cycles that may be required to rewrite lines back to memory when such lines are replaced in the cache since the number of such replacement bus cycles will be about the same for all three protocols.

The barrier implemented in each case is implemented by means of a shared variable that holds a count equal to the number of processors that have not reached the barrier. The action of a processor at the barrier is to (1) decrement the value of the barrier by reading its present value, and writing its new value, and (2) test the barrier repeatedly until its value reaches the value 0, then proceed.

It should also be assumed in the project example (for the sake of illustration only) that no processor has the barrier variable in its cache when the barrier code is reached.

Under the set of conditions described above, the Write/Invalidate protocol requires two bus cycles to execute Step 1. The first cycle retrieves the value of the barrier from the processor that last decremented the barrier variable (or from main memory in the case of the first processor), and the second cycle sends an invalidate signal to all other caches in order to maintain cache consistency.

Each processor must expend at least one cycle to perform Step 2 in order to obtain the current value of the variable since each time the value is decremented by some processor, the invalidation causes the value to disappear from all caches. The total number of cycles required is at least 3N cycles for N processors, and can be many more depending on how many cycles are expended at Step 2 to retrieve nonzero values of the barrier. There will be at least 2N cache misses.

The Write/Update protocol is more effective because each processor has to expend cycles only for Step 1. The variable is always present in cache in Step 2, and no bus cycles are required for this step. The number of cycles expended per processor in Step 2 is two cycles, one to obtain the prior value of the variable and one to update that value. For this protocol the number of bus cycles required is 2N and the number of cache misses required is N.

The Write/Load protocol avoids a cache miss by each processor during Step 1. After the first processor obtains the barrier variable from main memory, it places a copy in the caches of the cooperating processors. Thereafter, the processors that decrement the barrier variable can do so by means of a single bus cycle. It is assumed, for the purpose of this example, that the decrement of a barrier variable is an atomic operation in which the barrier variable is read from cache, decremented, and a bus request is issued.

If the bus request is successful, the new value is broadcast to the caches of all other processors, and rewritten into the local cache. If not, the operation is repeated. If the barrier variable has been altered by a remote processor, the new value is decremented rather than the former value.

This implementation of the barrier (using the Write/Load protocol) takes N bus cycles instead of at least 2N or 3N cycles as required by the other protocols. The reduction in bus cycles occurs because the barrier variable is loaded into remote caches in anticipation of future need even when those caches do not presently contain the barrier variables. Those skilled in the art will readily appreciate that the aforementioned savings, in terms of bus cycles, when using the Write/Load protocol to perform barrier synchronization demonstrates the utility of the protocol.

A description of the protocol per se, in the context of how it is intended to function in prior art single and multiprocessor computer architectures, will now be set forth with reference to FIGS. 1–5. From such description, those skilled in the art will be readily able to modify existing cache coherency protocol engines (in particular, cache controllers) to operate in the manner described herein.

FIG. 1 depicts a high level block diagram of a prior art multiprocessor system in which a plurality of CPUs, 102–103, are shown connected via bus 101 to a plurality of global memories 104–105. Interprocessor communications and communications between a given processor and the global memories, takes place over bus 101 utilizing bus commands supported by a given architecture. The bus commands which can, for example, be issued by a CPU, can be used to initiate the actual transfer of data between devices via bus 101.

Figure 2:
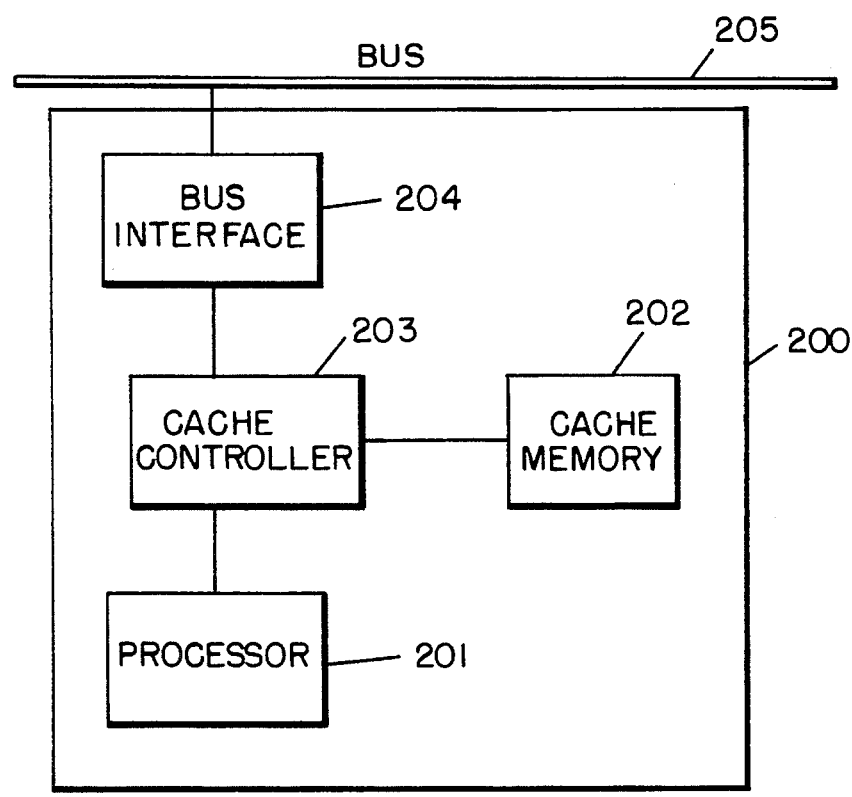
FIG. 2 depicts a high level block diagram of a prior art CPU, such as the CPU depicted in FIG. 1, including a cache controller which can be utilized to support the novel Write/Load protocol when operated in accordance with the teachings to be set forth herein.

FIG. 2 depicts a high level block diagram of a CPU, such as CPU 102 in FIG. 1., shown to include a processor 201, a cache memory 202, a cache controller 203, and a bus interface 204 (for coupling the CPU to a Bus, 201). The entire CPU is designated by reference numeral 200.

The cache memories in the system depicted in FIGS. 1 and 2 can be maintained coherently using one of the protocols described in the aforementioned Sweazey and Smith publication, plus the mechanism, termed Write/Load (W/L), being described herein.

In both the prior art systems and the new class of system architectures contemplated by the invention, maintaining the coherency of cache memory is the responsibility of the cache controllers. The design and use of cache controllers to support prior art coherency protocols is well known to those skilled in the art, and is documented in publications like the aforementioned Sweazey and Smith article. An outline of how a cache controller can be utilized to support various cache coherency protocols will nevertheless be set forth hereinafter for the sake of completeness.

A typical cache controller contains a directory of the lines in its cache along with status bits, i.e., information indicating, for example, whether or not a cache item (line) is held exclusively, or nonexclusively, or if the data in the line are valid or invalid. The action taken by the cache controller is in response to either an instruction issued by its associated processor, or in response to a bus instruction issued by another CPU or global memory. The cache controller can issue bus instructions, retrieve data from its cache, store data into its cache, and change its directory entries (e.g., change the status bits of a line).

The action of the cache controller depends upon the type command (i.e., type of bus instruction or processor instruction), the state of its cache as represented by its directory, and the cache coherency protocol.

Previous cache coherency mechanisms allow a cache controller to affect the contents of another cache in the system in one of two ways, either by issuing a Write/Update (WU) bus command or by issuing a Write/Invalidate (WI) bus command. Whenever a WU bus command is issued, if any other cache contains the datum, then it updates its copy of that datum. Whenever a WI bus command is issued, if any other cache contains the datum, then it invalidates its copy of that datum.

These commands can be mixed in the same system in a variety of ways so as to implement different cache coherency schemes.

According to the invention, a new mechanism is contemplated whereby a cache controller can alter the contents of another CPU's cache. This mechanism is the Write/Load (WL) command. The format of this command is, according to a preferred embodiment of the invention, WL A D, where A is the address operand and D is the data operand. When a cache controller either issues a WL command, or receives a WL command off the bus (issued by another cache controller), it, according to the invention, does the following: (1) if the address A is not already held in the cache, it removes some other line (if necessary) from the cache using a normal replacement policy. This may require writing back the removed line to the global memory; (2) marks the address A (in its cache directory) as being a valid entry in its cache which is held non-exclusively; and (3) stores D into the data area in its cache reserved for the data with address A.

Thus, at the end of the WL command, every cache in the system has a valid copy of the contents D of address A.

The different results achieved utilizing the WL and WI commands are apparent. After a WI command is executed, at most one valid copy of data exists in cache memory across the system. After a WL command is executed (in a broadcast mode) a valid copy of data will exist in every cache across the system. If the WL is issued in a multicast mode, a valid copy of the data will exist in at least a plurality of cache memories across the system.

The differences between the WL and the WU commands are as follows. If a cache controller receives a WU command and it does not hold the data (valid or invalid) in its cache, it does not respond to that command and thereby does not alter the contents of its cache. On the other hand, if a cache controller receives a WL command and it does not hold the data in its cache, it forces the data into its cache. If the cache controller does contain a valid copy of the data, then the effects of WU and WL on that cache are identical. According to the previously referenced teachings of Eggers and Katz, if the cache controller contains an invalid copy of the data, then the effects of WU and WL, on that cache are also identical.

Thus, WL permits one CPU (for example, CPU 102 of FIG. 1) to remotely load items into the cache of another CPU (for example, CPU 103 of FIG. 1). This remote loading can occur independently of any actions taken by CPU 103, i.e., loading of CPU 103's cache need not be initiated by CPU 103.

The use of WL, WI and WU can be combined in a variety of ways in a single system. For example, the cache controller can use WLs for writes to lines not held valid in its cache, while using WUs for all writes to lines held nonexclusively in its cache. Alternatively, the processor instruction set could include a special set of instructions that always produce a WL bus command, while other instructions requiring bus writes result in either a WI or WU. This latter implementation might be preferred for barrier synchronization, in which case a "prepare barrier" instruction would result in a WL.

Several extensions and variations of the architectures depicted in FIGS. 1 and 2 will now be described, wherein each architecture supports the use of the Write/Load protocol.

Figure 3:
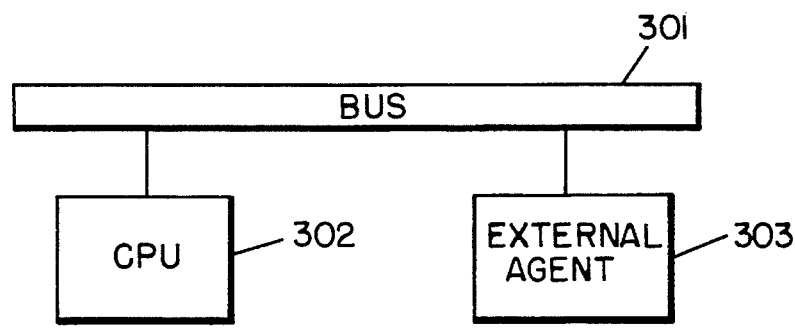
FIG. 3 depicts a computer system having a single CPU (such as the CPU depicted in FIG. 2) coupled to an external entity (sometimes referred to hereinafter as an external agent) via a communications bus.

FIG. 3 depicts a system with a single CPU, 302 (such as CPU 200 shown in FIG. 2), attached to a bus, 301. A device termed an "external agent" (also referred to herein as an "external entity"), is depicted as device 303 attached to bus 301.

According to a preferred embodiment of the invention, an external agent is permitted to respond to (and to issue) bus commands, including issuing WL commands to the CPU. This allows the external agent, acting autonomously from the CPU, to load the CPU's cache. As indicated hereinbefore, one use of such a capability is for the external agent to prefetch data into the CPU's cache in anticipation of future memory references.

Figure 4:
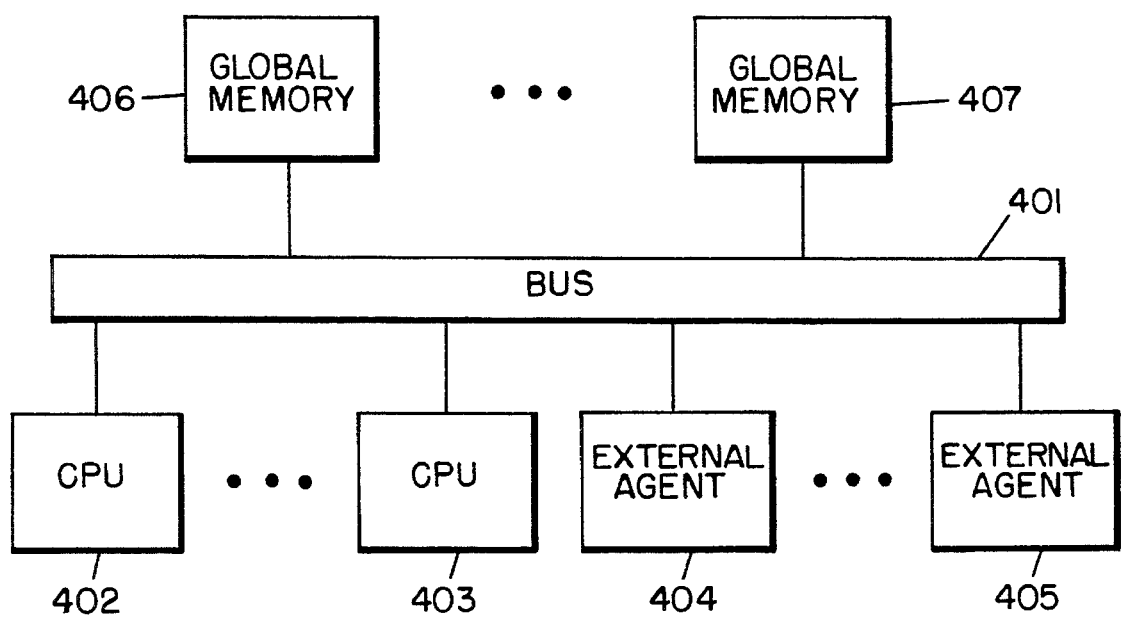
FIG. 4 depicts an extension of FIGS. 1 and 3, in which a plurality of CPUs, a plurality of global memories, and a plurality of external agents are connected together via a communications bus. The depicted system is utilized to explain how CPUs and external agents can communicate with one another by issuing and responding to bus commands, in particular, the novel Write/Load bus command type contemplated by the invention.

FIG. 4 depicts an extension of FIGS. 1 and 3 in which a plurality of CPUs (such as CPUs 402 and 403), a plurality of global memories (such as global memories 406 and 407), and a plurality of external agents (such as external agents 404 and 405), are connected together via bus 401. Both the CPUs and external agents are, according to one embodiment of the invention, permitted to respond to and to issue bus commands, including the Write/Load command.

The description of the Write/Load function set forth hereinbefore assumed (where a Write/Load command is broadcast to every cache memory in the system), that the cache of each CPU in the system is loaded by the WL command. As indicated hereinbefore, the invention contemplates not only the broadcast of WL commands, but a system that supports a multicast version of WL, in which only a certain subset of caches are affected by the WL command. The multicast version of WL, is for example, useful in performing barrier synchronization where only a subset of the system's processors are involved in determining if a given barrier is reached.

A preferred implementation of the multicast WL function is as follows. At any given time, each cache controller recognizes a certain set of "address spaces". Bus commands include an address space tag. When a cache controller observes a bus command with an address space tag different than one of its currently recognized tags, the cache controller ignores said bus command. Thus WL will load the cache of all those (and only those) CPUs that currently recognize the address space tag of the WL command.

Figure 5:
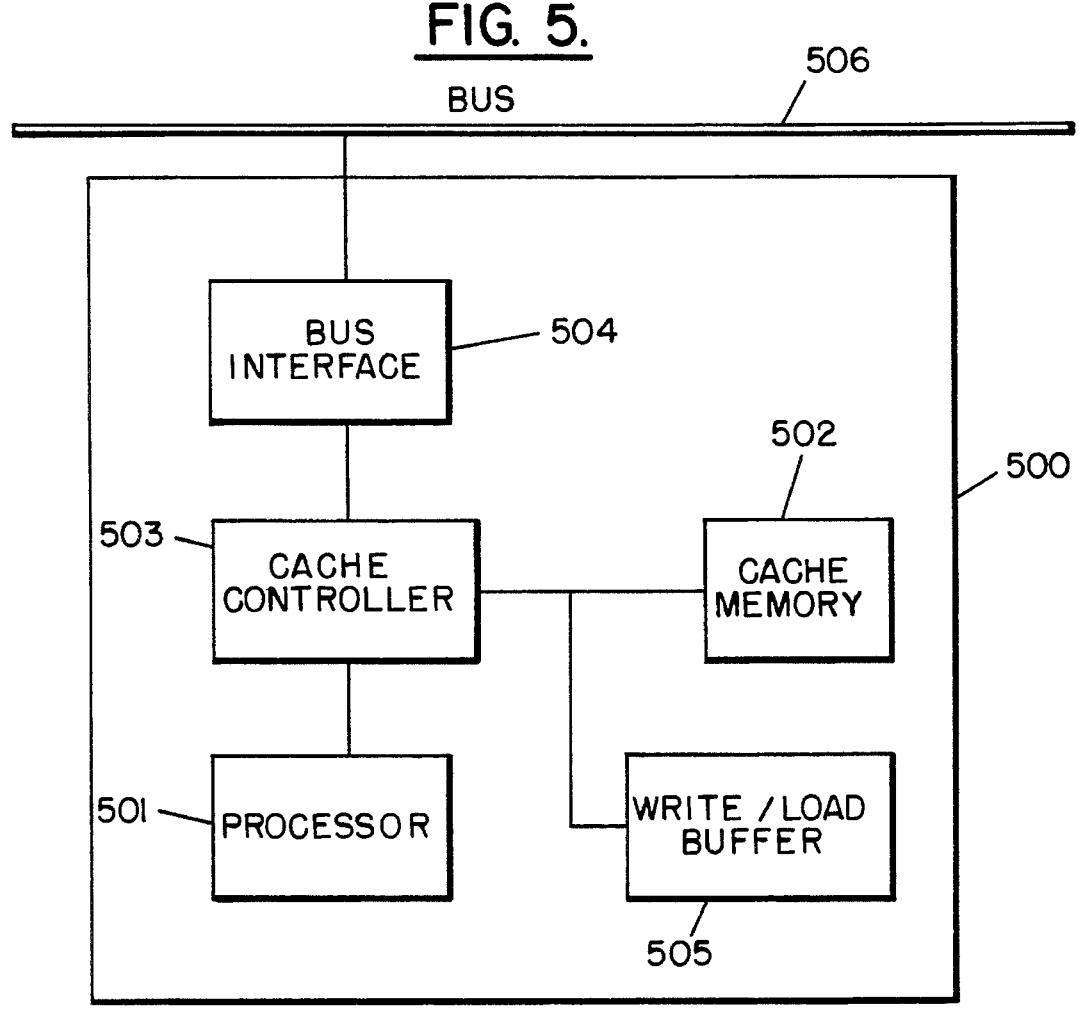
FIG. 5 depicts a high level block diagram of a CPU that includes a Write/Load Buffer (WLB), utilized to minimize bus traffic which may be caused by the replacement of cache items by data loaded into a set of cache memories via Write/Load commands.

As described above, a single WL command may result in up to N additional bus commands to be issued at approximately the same time, where N is the number of CPUs. This additional traffic is caused by the potential replacement of an item in the cache by the data just loaded by the WL command. A preferred implementation of WL also includes the use of a "Write/load Buffer" (WLB), as depicted in FIG. 5, to reduce the potential replacement traffic. Such buffers have been used in the prior art to hold cache data temporarily, thereby deferring accesses to cache memory until such time as they can be efficiently performed.

FIG. 5 is a high level block diagram of a CPU consisting of a processor 501, a cache memory 502, a cache controller 503, a bus interface 504 (coupling depicted CPU 500 to bus 506), and a Write/Load Buffer 505. The preferred WLB consists of a directory, memory and control logic. The WLB directory consists of m entries (for some number m), and there is presumed to be enough memory in the WLB to store the m data items corresponding to the directory.

When a cache receives a WL command, it enters the data into the WLB, evicting the oldest entry if the buffer is full. The evicted entry is entered into cache, either updating an existing entry if the cache contains one already, or replacing another entry if no update can be done.

When the process issues memory requests subsequently, the requests are honored by consulting both cache and the WLB. If an entry is found in both places, priority is given to its most recent version in the Write/Load buffer. When a cache miss occurs, in the time thus made available, the cache controller removes items from the WLB in first-in, first-out order.

This implementation reduces contention for the cache because it schedules Write/Load accesses to cache to occur mostly when cache is not busy serving the processor. Since the WLB is managed by the cache controller and can be thought of as a cache extension, consistency of WLBs is automatically maintained by the cache coherency scheme implemented by the cache controllers.

What has been described are methods and apparatus meeting all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. Apparatus for implementing a Write/Load protocol in a data processing system, wherein said system includes a remote processor and remote cache memory means associated with said remote processor and coupled to a communications bus via cache controller means and a local means which is external to said remote processor and capable of sending a Write/Load instruction that includes a data item to said remote cache memory means on said communications bus, comprising:

(a) means for updating said remote cache memory means in response to the appearance on said communications bus of a Write/Load instruction sent by said local means whenever the data item included with the Write/Load instruction is stored in said remote cache memory means; and (b) means for loading said data item included with said Write/Load instruction into said remote cache memory means without any involvement by said remote processor whenever said data item appearing on said communications bus is not stored in said remote cache memory means.

2. Apparatus as set forth in claim 1 wherein said means for loading is operative to store said data item into said remote cache memory means whenever the data item appearing on said communications bus is not validly stored in said remote cache memory means.

3. Apparatus as set forth in claim 1 wherein said means for loading further comprises means for creating an entry in said remote cache memory means whenever the data item appearing on said communications bus is not stored in said remote cache memory means.

4. Apparatus as set forth in claim 3 wherein said means for loading further comprises Write Load Buffer means for temporarily storing data items to be loaded into said remote cache memory means.

5. Apparatus as set forth in claim 3 wherein said means for loading is responsive to all Write/Load instructions and associated data items broadcast over said communications bus.

6. Apparatus as set forth in claim 3 wherein said means for loading is operative to selectively respond to Write/Load instructions and associated data items appearing on said communications bus, to thereby facilitate the selective loading of data items into said remote cache memory means.

7. Apparatus as set forth in claim 3 wherein said means for updating is implemented as part of said cache controller means.

8. Apparatus as set forth in claim 3 wherein said means for loading is implemented as part of said cache controller means.

9. Apparatus as set forth in claim 3 wherein said remote cache memory means includes a plurality of cache memories, each of which is controlled by a cache controller included in said cache controller means, and further wherein each cache controller includes both said means for updating and said means for loading.

10. A computer system architecture that supports the updating and loading of a variable into cache memory of a remote processor in response to a write/Load command that includes said variable being placed on a communications bus by a local means external to said remote processor, comprising:

(a) at least one remote processor;

(b) cache memory owned by each of said at least one remote processor;

(c) a cache controller coupling both a given cache memory and the remote processor owning said given cache memory to a communications bus;

(d) a communications bus;

(e) means for updating said given cache memory in response to the appearance on said communications bus of a Write/Load command that includes a variable, whenever said variable is stored as a data item in said given cache memory; and (f) means for loading said variable into said given cache memory without any involvement by said remote processor owning said given cache memory in response to the appearance on said communications bus of said Write/Load command, whenever said variable is not already stored in said given cache memory.

11. Apparatus as set forth in claim 10 wherein said means for loading further comprises means for creating an entry in said given cache memory whenever said variable is not stored in said given cache memory.

12. Apparatus as set forth in claim 11 wherein said means for loading is responsive to all Write/Load commands and included variables broadcast over said communications bus.

13. Apparatus as set forth in claim 11 wherein said means for loading is operative to selectively respond to Write/Load commands and included variables appearing on said communications bus, to thereby facilitate selective loading of cache memory.

14. Apparatus as set forth in claim 11 wherein said means for updating is implemented utilizing said cache controller.

15. Apparatus as set forth in claim 11 wherein said means for loading is implemented utilizing said cache controller.

16. Apparatus as set forth in claim 11 wherein said cache controller includes said both said means for updating and said means for loading.

17. A bus based computer system that facilitates the updating and loading of variables in a cache memory serving a processor and coupled to a communications bus in response to Write/Load commands and a variable associated with each such command being placed on said communications bus by a remote means not served by said cache memory, comprising:

(a) means, responsive to a Write/Load command appearing on said communications bus and sent by said remote means, for updating a value in said cache memory of the variable associated with said command, whenever said variable is in said cache memory, and (b) means responsive to said Write/Load command, for creating an entry in said cache memory for said variable, and for loading said variable therein, without any involvement by said processor served by said cache memory, whenever said variable is not in said cache memory.

18. Apparatus as set forth in claim 17 wherein said means for creating and loading is operative to selectively respond to Write/Load instructions and associated variables appearing on said communications bus, to thereby facilitate selective loading of cache memory.

19. A multiprocessor computer system including a plurality of processors, each of which has a cache memory and cache controller combination associated therewith, and a communications bus for interconnecting said plurality of processors via each of their respective associated cache controllers, comprising means for enabling at least one of said plurality of processors to load data, via said communications bus, into the cache memory associated with at least one other of said plurality of processors without any involvement by said at least one other of said plurality of processors.

20. Apparatus as set forth in claim 19 wherein said at least one of said plurality of processors issues a Write/Load instruction and places said instruction on said communications bus.

21. Apparatus as set forth in claim 20 wherein said at least one other of said plurality of processors is responsive to said Write/Load instruction.

22. A multiprocessor computer system including a plurality of processors, each of which has a cache memory and cache controller combination associated therewith, and a communications bus for interconnecting said plurality of processors via each of their respective associated cache controllers, comprising means responsive to a bus command issued by a first cache controller and appearing on said communications bus, and data associated with said bus command, to enable a second cache controller to load said data into its associated cache memory without any involvement by the processor associated with said second cache controller.

23. A bus based computer architecture including at least one processor, cache memory owned by a given processor, and cache controller means for interconnecting said given processor and the cache memory owned by said processor to a communications bus, comprising means for enabling at least one external entity to load data into said cache memory via said communications bus without any involvement by said given processor.

24. Apparatus as set forth in claim 23 wherein said means for enabling further comprises apparatus for supporting a Write/Load cache protocol.

25. Apparatus as set forth in claim 23 wherein said external entity is a prefetch mechanism.

26. Apparatus as set forth in claim 19 wherein said means for enabling is used to perform barrier synchronization between at least two of said plurality of processors in said multiprocessor computer system.

27. Apparatus as set forth in claim 19 wherein said means for enabling is utilized to maintain the coherency of data stored in the set of cache memories associated with said plurality of processors.

28. Apparatus as set forth in claim 27 further comprising Write Load Buffer means to facilitate the temporary storage of data to be loaded into cache memory.

29. Apparatus for reducing the traffic on a communications bus interconnecting a plurality of processors in a multiprocessor computer system, comprising means for supporting a Write/Load cache coherency protocol in said computer system, whereby any one of said processors can load a shared variable into caches owned by other ones of said processors without any involvement by said other ones of said processors by broadcasting a single Write/Load command that includes a value for said shared variable on said communications bus.

30. Apparatus as set forth in claim 29 further comprising Write Load Buffer means to facilitate the temporary storage of a value for said shared variable to be loaded into cache memory utilizing said Write/Load cache coherency protocol.

31. A processor chip, for use in a bus based computer system, wherein said processor chip includes a processor, cache memory and a cache controller for coupling said processor and cache memory to a system communications bus, comprising means responsive to a bus command and data associated with said command broadcast on said system communications bus by an entity external to said chip, for updating the contents of said cache memory with said data whenever a cache entry containing a previous value of said data is stored therein, and for otherwise loading said data into said cache memory without any involvement by said processor.

32. Apparatus as set forth in claim 31 wherein said processor chip is responsive to bus commands issued by an external entity to support a prefetch mechanism.

33. Apparatus as set forth in claim 31 wherein said processor chip is responsive to bus commands issued by another processor chip, to maintain cache coherency.

34. Apparatus as set forth in claim 31 wherein said processor chip is responsive to bus commands issued by another processor chip, to perform barrier synchronization.

35. Apparatus as set forth in claim 31 wherein said processor chip is capable of being selectively responsive to one of said bus commands.

36. Apparatus as set forth in claim 31 wherein said processor chip is capable of being selectively responsive to one of said bus commands.

37. A bus based computer system comprising:
 (a) a communications bus;
 (b) at least one central processor unit (CPU), including a processor and cache memory, coupled to said communications bus; and
 (c) means for implementing a bus command structure that is operative to issue and respond to bus commands, and which is further operative in response to observing a Write/Load command on said communications bus, to enable data to be loaded into cache memory located in a given CPU by an entity other than the processor located in said given CPU without any involvement by said processor located in said given CPU.

38. Apparatus as set forth in claim 37 wherein said entity is an external prefetch mechanism.

39. Apparatus as set forth in claim 37 wherein said entity is a processor located in a second CPU whenever said system includes a plurality of CPUs.

40. Apparatus as set forth in claim 37 wherein said means for implementing is a cache controller interconnecting both said processor and said cache memory to said bus.

41. A method for implementing a Write/Load cache protocol in a data processing system, wherein said system includes cache memory means associated with a processor and coupled to a communications bus via cache controller means, comprising the steps of:
 (a) updating said cache memory means in response to the appearance on said communications bus of a Write/Load instruction and a data item associated therewith broadcast by an external entity, whenever said data item is stored in said cache memory means; and
 (b) loading said data item into said cache memory means whenever the data item appearing on said communications bus is not stored in said cache memory means without any involvement by said processor.

42. A method as set forth in claim 41 wherein said step of loading further comprises the step of storing said data item into said cache memory means whenever the data item appearing on said communications bus is not validly stored in said cache memory means.

43. A method as set forth in claim 41 wherein said step of loading further comprises the step of creating an entry in said cache memory means whenever the data item appearing on said communications bus is not stored in said cache memory means.

44. A method as set forth in claim 43 wherein said step of loading further comprises the step of temporarily storing data items to be loaded into said cache memory means.

45. A method as set forth in claim 43 wherein said step of loading is performed in response to all Write/Load instructions and associated data items broadcast over said communications bus.

46. A method as set forth in claim 43 wherein said step of loading is selectively performed in response to Write/Load instructions and associated data items appearing on said communications bus.

47. A method as set forth in claim 43 wherein said step of updating is implemented utilizing said cache controller means.

48. A method as set forth in claim 43 wherein said step of loading is implemented utilizing said cache controller means.

49. A method for the updating and loading of variables in a cache memory associated with a processor and coupled to a communications bus, in a bus based computer system architecture, in response to Write/Load commands and a variable associated with each such command broadcast on said communications bus by any external entity, comprising the steps of:
 (a) updating, in response to a Write/Load command appearing on said communications bus, the value in said cache memory of the variable associated with said command, whenever said variable is in said cache memory, and
 (b) creating an entry in said cache memory for said variable, and loading said variable therein, without any involvement by said processor, in response to said Write/Load command, whenever said variable is not in said cache memory.

50. A method as set forth in claim 49 wherein said step of creating and loading is selectively performed in response to Write/Load instructions and associated variables appearing on said communications bus.

51. A method, for use in a multiprocessor computer system including a plurality of processors, each of which has a cache memory and cache controller combination associated therewith, and a communications bus for interconnecting said plurality of processors via each of their respective associated cache controllers, for enabling at least one of said plurality of processors to load data, via said communications bus, into the cache memory associated with at least one other of said plurality of processors, comprising the steps of:
 (a) issuing, via said at least one of said plurality of processors, a Write/Load instruction;
 (b) placing said instruction, via the cache controller associated with said at least one of said plurality of processors, on said communications bus; and
 (c) responding, via the cache controller associated with said at least one other of said plurality of processors, to said Write/Load instruction by loading said data into the cache memory associated with said at least one other of said plurality of processors without any involvement by said a least one other of said plurality of processors, whenever said data is not stored in said cache memory.

52. A method, for use in a multiprocessor computer system including a plurality of processors, each of which has a cache memory and cache controller combination associated therewith, and a communications bus for interconnecting said plurality of processors via each of their respective associated cache controllers, for loading data from one of said cache controllers into the cache memory associated with another one of said cache controllers, comprising the steps of:
 (a) recognizing a bus command broadcast on said communications bus by one of said cache controllers, and data associated with said bus command; and
 (b) enabling another one of said cache controllers to load said data into its associated cache memory without any involvement by the processor associated with said another one of said cache controllers.

53. A method, for use in a bus based computer architecture, wherein said architecture includes at least one processor, cache memory owned by a given processor, and cache controller means for interconnecting said given processor and the cache memory owned by said given processor to a communications bus, for enabling at least one external entity to load data into said cache memory via said communications bus without any involvement by said given processor, comprising the steps of:

(a) supporting, via said architecture, a Write/Load cache protocol; and (b) recognizing, utilizing said cache controller means, Write/Load bus commands issued by said at least one external entity, to thereby invoke the Write/Load cache protocol supported by said architecture.

54. A method as set forth in claim 53 wherein said external entity is a prefetch mechanism.

55. A method as set forth in claim 51 wherein said step of issuing is used to perform barrier synchronization between at least two of said plurality of processors in said multiprocessor computer system.

56. A method as set forth in claim 51 wherein said step of issuing is utilized to maintain the coherency of data stored in the set of cache memories associated with said plurality of processors.

57. A method for reducing the traffic on a communications bus interconnecting a plurality of processors in a multiprocessor computer system, comprising the steps of:

(a) supporting a Write/Load cache coherency protocol in said computer system, whereby any one of said processors can load a shared variable into caches owned by other ones of said processors without any involvement by said other ones of said processors by broadcasting a single Write/Load command that includes a value for said shared variable on said communications bus; and (b) utilizing Write Load Buffer means to facilitate the temporary storage of data to be loaded into cache memory when utilizing said Write/Load cache coherency protocol.

58. A method for use by a processor chip incorporated into a bus based computer system, wherein said processor chip includes a processor, cache memory and a cache controller for coupling said processor and cache memory to a system communications bus, comprising the steps of:

(a) recognizing a Write/Load bus command broadcast by an entity external to said chip, and data associated with said command, appearing on said communications bus;

(b) updating the contents of said cache memory with said data whenever a cache entry containing a previous value of said data is stored therein; and (c) otherwise loading said data into said cache memory without any involvement by said processor.

59. A method as set forth in claim 58 wherein said processor chip is responsive to bus commands issued by an external entity to support a prefetch mechanism.

60. A method as set forth in claim 58 wherein said processor chip is responsive to bus commands issued by another processor chip, to maintain cache coherency and to perform barrier synchronization.

61. Apparatus for implementing a Write/Load bus command in a multiprocessor system having a multiplicity of processor subsystems and a bus interconnecting said processor subsystems, each of said processor subsystems having a cache serving a processor, said apparatus comprising:

means for any one of said processor subsystems to broadcast a Write/Load command on said bus, said Write/Load command including a data item;

means for each one of said processor subsystems to detect a Write/Load command broadcasted on said bus by any other one of said processor subsystems;

means in each one of said processor subsystems, upon detection of a Write/Load command on said bus, for determining whether said data item included with said detected Write/Load command is stored in said cache of said processor subsystem detecting said Write/Load command;

means in each one of said processor subsystems, upon determination that a data item included with a detected Write/Load command is stored in said cache of said processor subsystem detecting said Write/Load command, for replacing said data item stored in said cache of said processor subsystem detecting said Write/Load command with said data item included with said detected Write/Load command;

means in each one of said processor subsystems, upon determination that a data item included with a detected Write/Load command is not stored in said cache of said processor subsystem detecting said Write/Load command, for storing said data item included with said detected Write/Load command in said cache of said processor subsystem detecting said Write/Load command without any involvement by the processor served by said cache, whereby any one of said processor subsystems can cause a data item to be validly stored in all of said caches of said multiprocessor system through use of said Write/Load bus command.

* * * * *